No. 12,079. REISSUED FEB. 3, 1903.

C. B. RUSSELL.

ELECTRICAL SWITCH OPERATING MECHANISM.

APPLICATION FILED DEC. 9, 1902.

2 SHEETS—SHEET 1.

WITNESSES

J. Spigg Poole

Walter D. Macdonald

INVENTOR

Clifton B. Russell.

by Herbert W. J. Jenner.

Attorney

No. 12,079. REISSUED FEB. 3, 1903.

C. B. RUSSELL.

ELECTRICAL SWITCH OPERATING MECHANISM.

APPLICATION FILED DEC. 9, 1902.

2 SHEETS—SHEET 2.

WITNESSES

J. Lynn Poole

Walter Davidson

INVENTOR

Clifton B. Russell by Chas. E. Jenner.

Attorney

UNITED STATES PATENT OFFICE.

CLIFTON B. RUSSELL, OF MARLBORO, MASSACHUSETTS, ASSIGNOR OF ONE-HALF TO HERBERT E. RYDER, OF MARLBORO, MASSACHUSETTS.

ELECTRICAL SWITCH-OPERATING MECHANISM.

SPECIFICATION forming part of Reissued Letters Patent No. 12,079, dated February 3, 1903.

Original No. 680,626, dated August 13, 1901. Application for reissue filed December 9, 1902. Serial No. 134,589.

*To all whom it may concern:*

Be it known that I, CLIFTON B. RUSSELL, residing in the city of Marlboro, county of Middlesex, State of Massachusetts, have invented certain new and useful Improvements in an Electrical Switch-Operating Mechanism; and I do hereby declare the following to be a full and clear description thereof.

My invention relates to switches.

The object of my improvements is to provide a railroad-switch with an electrically-operated device actuated either by the car or from some other given point.

My invention is adapted to actuate the switches of any railroad, whether electric, steam, cable, or other system of power transmission.

As the improvements are admirably adapted for electrically-operated surface and elevated railways, they will in their preferred form be described in connection with such systems.

In carrying out my invention I have found it generally desirable that the switches be operated from the cars themselves. This feature I have carried into effect by utilizing the power for driving the cars and arranging a movable contact for connecting the car at the proper time with the electrical switch-operating mechanism. The details of the instruments through which these objects are attained are illustrated in the accompanying drawings and subjoined description, and the patentable features are set forth in the claims.

Figure 1:
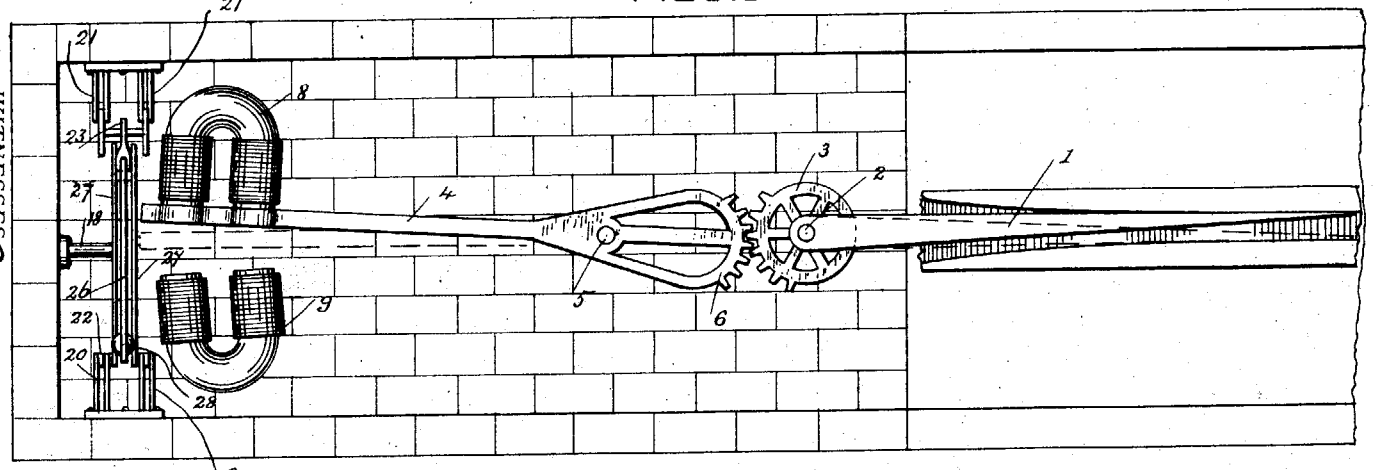
Figure 2:
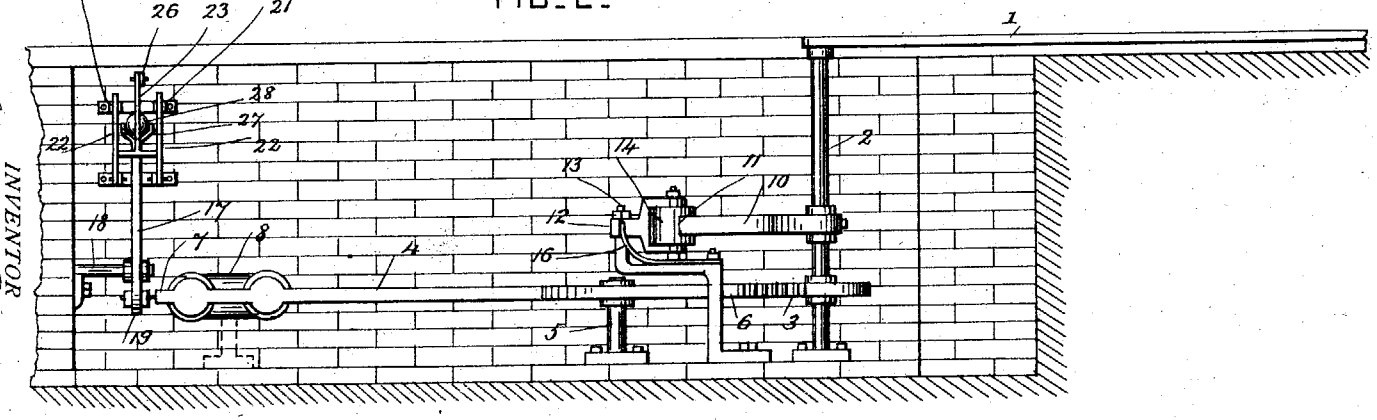
Figure 5:
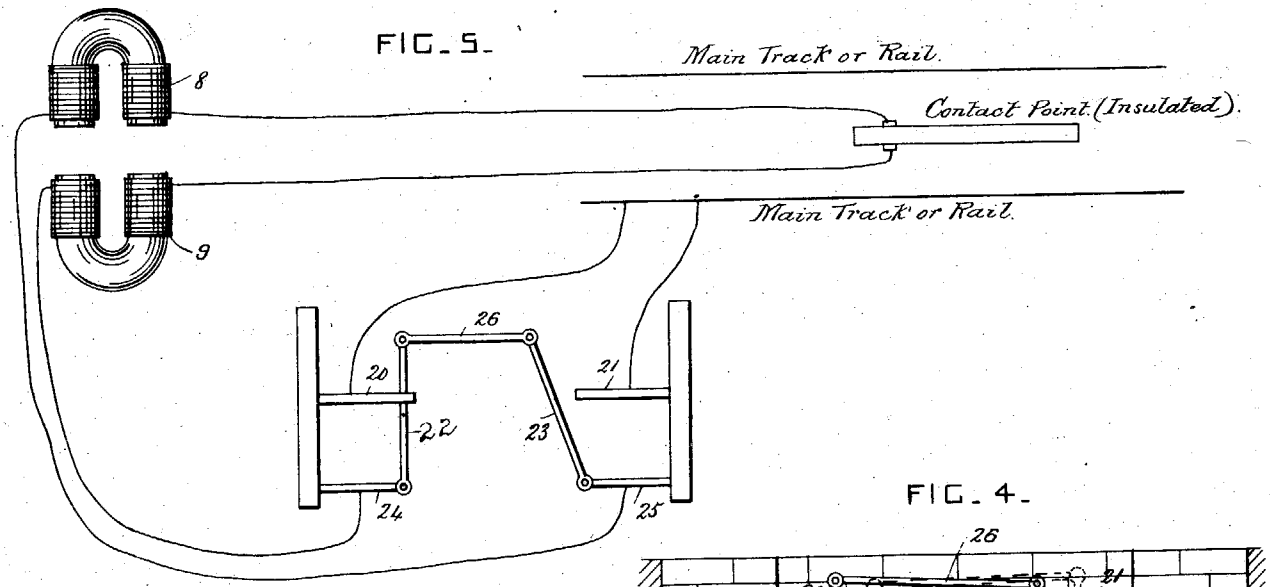
Figure 4:
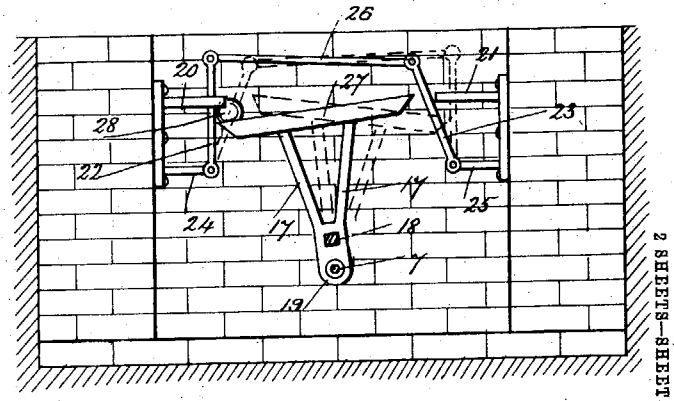
Figure 3:
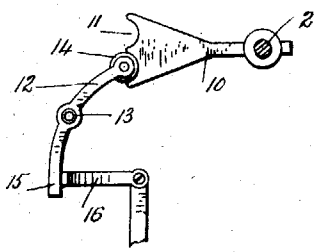

Figure 1 represents a plan view of an apparatus embodying my invention. Fig. 2 is a side elevation of the same. Fig. 3 is a detail plan of a part hereinafter referred to. Fig. 4 is an end elevation of a form of time-switch for use in connection with my improvements. Fig. 5 is a diagrammatic view illustrating the circuits.

In the drawings, 1 represents a switch-point such as in ordinary use upon railways.

2 is a shaft upon which the switch oscillates. This shaft is adapted to project below the surface of the track to any suitable extent.

3 is a segment-gear, both it and the switch-point 1 being fast upon the pivot-shaft 2, so that they vibrate in unison.

4 is a lever pivoted at 5 and having a segment-gear 6, with one end adapted to mesh with the segment-gear 3. The other end of the lever 4 constitutes an armature-lever 7 and is placed between two electromagnets 8 and 9, which are adapted, respectively, to alternately attract the armature-lever 7 from one set of pole-faces to the other for the purpose of throwing the switch-point 1, as will be hereinafter explained. These electromagnets are wound in any suitable known manner to adapt them to this particular service, and a wire is led from each magnet to a contact-block, preferably located between the tracks. When electric cars are run upon the track, they are provided with a movable shoe which is in circuit with the trolley or in a third-rail system in circuit with the third rail under the car-body, with suitable mechanism provided for the motorman for the purpose of throwing the shoe down into the path of the contact-block whenever desired and making electrical connections with either one of the magnets 8 or 9, as will be hereinafter set forth.

10 is an arm rigidly secured to the pivot-shaft 2 and provided with two depressions 11.

12 is a lever pivoted at 13. This lever has a roller 14 at one end adapted to rest in either depression 11 of the arm 10. The other end of the lever, 15, is provided with a spring 16, constantly bearing against the same for the purpose of throwing the roll 14 into either depression 11 and also permitting the roll to yield when the arm 10 is vibrated in order to drop into either depression. Its operation will be described farther on.

17 is a lever carried vertically upon a bearing 18. The lower end of lever 17 is connected with the end of the armature-lever 7 at 19.

20 and 21 are electrodes disposed in series opposite each other.

22 and 23 are electrodes pivoted, respectively, at 24 and 25 at their lower ends and at their upper ends to a connecting-rod 26, so that they may move in unison.

The electrodes 20 and 22 and 21 and 23 form two knife-switches for the purpose of changing the current from one to the other of the magnets 8 and 9. When the knife-electrode 22 enters between the arms of the electrode 20, electrical connection between electrodes 21 and 23 is cut out, and when 21 and 23 are in contact the circuit between 20 and 22 is broken. Lever 17 carries a tilting ball-runway 27, composed of parallel rails, which may be inclosed, along which the ball 28 passes from one end to the other when the lever 7 is oscillated and the inclination of the runway 27 is reversed.

The operation is as follows: One wire is led from the magnet 9 to the contact-point in the road-bed. Another wire is led from the main track or rail to the switch-electrode 20. The other wire from the magnet 9 is led to the switch-electrode 22. Similarly a wire is led from the magnet 8 to said contact-point, and from the main track or rail another wire leads to the switch-electrode 21. The other electrode 23 of the switch leads back to the magnet 8. When the car arrives in the vicinity of the switch and it is desired to throw the switch from full lines to the dotted position, the contact-shoe of the car is lowered, so as to make electrical connection. The switch electrode or electrodes 20 and 22 are in electrical contact, and the current flows through the switch and energizes the magnet 9, to which the switch is connected. The armature-lever 7 is thereby attracted to that magnet, moving the lever 4 and the switch-point 1 through the segment-gears. At the same time the lever 17 is vibrated and the runway 27 reversed in its inclination. The ball 28 thereon runs down the incline to the opposite end of the runway, when it strikes the electrode switch-lever 23, forcing it into contact with the electrode 21. The passage of the ball from one end of the runway to the other is performed so slowly that the car passes by the contact-point before there can be a reversal of the switch. Moreover, as soon as the motorman sees that the switch is thrown he raises the contact-shoe on the car, thereby preventing any reversal of the switch. The opposite movement to throw the switch-point back again is performed in the same manner, the current passing through the electromagnet 8, for the reason that the switch 21 23 is connected and the switch 20 22 open.

For the purpose of holding the switch-point in either position I employ the holding or retarding device shown more particularly in Fig. 3. The arm 10 being rigid with the switch vibrates in unison therewith. In the movement of this arm 10 the inclined depressions 11 force the roll 14 outwardly against the pressure of the yielding spring 16. After the arm 10 has completed its half-movement the roll 14 commences to enter the other depression 11, when the spring 16 aids the magnets in throwing the switch. It will be clearly seen that this retarder holds the switch-point in either position it may be placed in and prevents any accidental reversal of the same. The pressure of the spring 16 is comparatively light and is easily overcome by the action of the magnets upon the levers.

While it is desirable that the current used for operating the cars be employed to throw the switch, yet an independent source of electrical supply may be used, in which case the railroad need not necessarily be an electric road, but may be a steam or other power propelled road.

Instead of the geared lever 4 other equivalent lever motions may be employed to throw the switch through the agency of the electromagnets. The electromagnets may be adjusted to secure their proper relation to the armature-lever. The contact-point in the road-bed or third rail is insulated from the track and arranged at any suitable distance from the switch. In practice it should be, say, one or two feet in length and so located that when the shoe on the car makes contact therewith the car will be over the contact-point to prevent accidents. My device permits of the throwing of the switch by hand without interfering with the electrical mechanism. Proper resistance may be placed in the line to prevent short-circuiting. The armature-lever 4 can be disposed at right angles to the switch-point, if desired, by making suitable changes in the gear-segments. The apparatus may also operate a double switch-point and with proper connections be made to operate safety and danger signals.

The course of the current is illustrated in Fig. 5. The current always flows through the switch that is closed and its connecting-magnet, the lever 17 operating to alternately open and close each switch.

What I claim as new, and desire to secure by Letters Patent, is—

1. In a railroad, the combination of a switch, lever mechanism for operating said switch, connected to the switch-shaft and disposed in a horizontal plane, a free vibrating armature formed on said lever mechanism, electromagnets located upon opposite sides of the armature, and electrical means for exciting either magnet to throw the switch, whereby the armature is entirely withdrawn from one magnet to the other alternately.

2. In a railroad, the combination of a switch, a rocking shaft therefor, a gear upon the shaft, a pivoted lever having a gear meshing with the switch-shaft gear, and an armature upon the opposite end, electromagnets upon opposite sides of the armature and electrical means for exciting either magnet to throw the switch.

3. In a railroad, the combination of a switch, lever mechanism for operating said switch, a vibrating armature formed on said lever mechanism, electromagnets located upon opposite sides of the armature, line-wires connecting the magnets, a rolling weight-operated time-switch for alternately connecting each magnet, and means for exciting the magnets to throw the switch.

4. In a railroad, the combination of a switch, lever mechanism for operating said switch, a vibrating armature formed on said lever mechanism, electromagnets located upon opposite sides of the armature, means for exciting the magnets to throw the switch, a retarding-block secured to the switch-shaft, and a yielding retarder for holding the switch in either position.

5. The combination, with a switch-point, and a vertical pivot-shaft secured to it; of a toothed gear secured on the said shaft, a pivoted armature-lever having a toothed segment which engages with the said gear, and an electromagnet for operating the said armature-lever, substantially as set forth.

6. The combination, with a switch-point, lever mechanism for operating the switch-point, and an electromagnet for actuating the said lever mechanism; of a rolling weight-operated time-switch for connecting the said electromagnet with the line-wire, substantially as set forth.

7. The combination, with a switch-point, lever mechanism for operating the said switch-point, and an electromagnet for actuating the said lever mechanism; of a retarding-block operatively connected with the said switch-point, and a yielding retarder engaging with the said retarding-block and holding the said switch-point from accidental displacement, substantially as set forth.

In testimony whereof I have affixed my signature in the presence of two witnesses.

CLIFTON B. RUSSELL.

Witnesses:

EDW. R. COLLINS,

LINA M. BRABAZON.